United States Patent [19]

Hathaway

[11] 4,151,569

[45] Apr. 24, 1979

[54] POSITIONABLE TRANSDUCER MOUNTING STRUCTURE USING A PIEZOELECTRIC BENDER ELEMENT

[75] Inventor: Richard A. Hathaway, Saratoga, Calif.

[73] Assignee: Ampex Corporation, Redwood City, Calif.

[21] Appl. No.: 668,651

[22] Filed: Mar. 19, 1976

[51] Int. Cl.² .................. G11B 21/10; G11B 5/52; G11B 21/18
[52] U.S. Cl. .................... 360/77; 360/107; 360/109
[58] Field of Search .......... 360/77, 75, 70, 107, 360/109, 113, 104; 310/332, 330–331, 326–327

[56] References Cited

U.S. PATENT DOCUMENTS

| | | | |
|---|---|---|---|
| 3,126,535 | 3/1964 | Streeter | 360/77 |
| 3,585,291 | 6/1971 | Yamakawa | 360/70 |
| 3,706,861 | 12/1972 | Giel | 360/75 |
| 3,787,616 | 1/1974 | Falk | 360/75 |
| 3,905,043 | 9/1975 | Frank | 360/75 |
| 3,994,018 | 11/1976 | Kihara et al. | 360/105 |
| 3,995,317 | 11/1976 | Schmidt | 360/107 |

FOREIGN PATENT DOCUMENTS

| | | | |
|---|---|---|---|
| 1275580 | 8/1968 | Fed. Rep. of Germany | 360/70 |
| 2293118 | 11/1975 | France | 360/77 |
| 48-38102 | 6/1973 | Japan | 360/77 |
| 49-20208 | 5/1974 | Japan | 360/77 |
| 49-84617 | 8/1974 | Japan | 360/77 |
| 7409513 | 7/1974 | Netherlands | 360/77 |
| 387423 | 6/1973 | U.S.S.R. | 360/75 |
| 402914 | 10/1973 | U.S.S.R. | 360/77 |

OTHER PUBLICATIONS

IBM Tech. Disc. Bull., C. E. Price, vol. 12, No. 1, Jun. 1969, pp. 33–34.

*Primary Examiner*—Alfred H. Eddleman

[57] ABSTRACT

To adapt a magnetic transducer for controlled positioning use where there is relative motion between the transducer and a magnetic recording surface, such as a magnetic tape, the transducer is mounted at the end of a thin leaf for sweeping motion displacement laterally to a track along the record surface and within a predetermined desired range of displacement across the record surface. The thin leaf is restrained against motion causing the transducer to move in any manner other than laterally to the track. In one embodiment, the leaf is a piezoelectric bender element, and in another embodiment the leaf is an electromagnetically responsive leaf element.

29 Claims, 12 Drawing Figures

FIG. 1

FIG_3

FIG_4

FIG_5

FIG_6

FIG_7

FIG_8

FIG_9

FIG_10

FIG_11A

FIG_11B

POSITIONABLE TRANSDUCER MOUNTING STRUCTURE USING A PIEZOELECTRIC BENDER ELEMENT

Co-pending related applications include U.S. Ser. No. 668,571 (I.D. 2453) for Automatic Scan Tracking by Robert Allen Hathaway filed on even date herewith.

BACKGROUND OF THE INVENTION

This invention relates to transducer mounting structures, and particularly to such structures adapting a transducer to controlled positioning use where there is relative motion with respect to a record surface.

Generally, in the recording and reproducing art, and particularly in the magnetic head recording and reproducing art, there has been difficulty in keeping the transducer (head) upon a predetermined linear or curvilinear path, such as a track that has been recorded in an irregular path, or that has been correctly recorded but subsequently distorted. Such difficulty occurs in the magnetic disc and magnetic drum art with respect to scanned paths that move in spirals or helices, or in circles eccentric to the center of rotation. However, extreme difficulty in tracking is present in the helical tape recording art with respect to recorded tracks that have been distorted, as by temperature or humidity-induced dimensional changes in the tape, or by faulty tensioning mechanisms in the tape transport. Additionally, in certain magnetic record medium applications it is desirable to control the recording path, e.g., to alter the direction of the path from its normal direction. In such applications, tracking is also important and difficult.

In the art, controlled transducer-to-medium positioning is accomplished by changing the relative head-to-medium speed or by adjusting the relative head-to-medium position. Examples of techniques in which the position and/or velocity of the record medium is controlled while being transported past the transducer are described in U.S. Pat. Nos. 3,663,736; 3,748,408 and 3,838,453. In some of these medium transport control positioning techniques, data reproduced from the record medium by a transducer whose tracking is to be controlled is monitored to provide a control signal for adjusting the transport of the record medium to maintain proper tracking by the transducer ('763 Patent). Others of these medium transport control positioning techniques utilize control track information separately recorded from the data to obtain control signals for adjusting tension of the record medium to maintain proper tracking by the transducer ('408 Patent). Still others of these medium transport control positioning techniques control both the speed of record medium transport and the position of the transported record medium relative to the transducer to maintain proper tracking by the transducer ('453 Patent). Changing the speed of transport of the record medium has the undesirable tendency of altering the time base of data reproduced from tracks recorded in the direction of the transport of the record medium. Furthermore, techniques which rely upon the control of the transport of the record medium to maintain proper tracking by the transducer are not suitable for precise control of the transducer position relative to paths along the record medium, particularly where large displacements (0.05 cm.) of transducer/record medium position may be required at high rates (200 deflection cycles per second) to maintain proper tracking by the transducer.

Positionable transducer mounting techniques also are employed to provide controlled tracking. For example, U.S. Pat. Nos. 3,126,535; 3,246,307 and 3,292,168 describe transducer positioners of the kind in which a transducer is carried at the end of a rigid arm ('307 and '535 Patents) or by other inflexible support ('168 Patent) that is moved back and forth by an actuator mechanism to position the transducer with respect to a selected path before transferring information to or from the scanned path. Such partitioners are satisfactory if the predictable path is followed with sufficient precision to obviate further positioning of the pre-positioned transducer. Many magnetic disc, drum and tape record/reproduce machines are able to position and transport their magnetic record media and transducers so that the tracks of recorded information follow such predictable paths. However, transducer positioners of the kind described in the aforementioned U.S. Patents are not suitable where very precise control of the transducer position is desired at all times, such as for transducers of rotary scan magnetic record/reproduce machines.

Energy transformers, such as piezoelectric transducers, have been used in various applications requiring controlled positioning of apparatus, including magnetic transducers (U.S. Pat. No. 3,526,726). A survey of piezoelectric transducers and their applications is presented in the article "Piezoelectric Ceramic Transducers" by Charles Edmiston, published in Electronic Design, 18 Sept. 1974, pages 78–82. Such transducers are especially attractive for use as low force, large displacement positioners. In the '726 Patent, piezoelectric transducer assemblies are described for reducing transducer displacement errors by positioning a normally stationary magnetic transducer in any one or more of three directions relative to longitudinal tracks along a longitudinally transported magnetic tape. Each piezoelectric transducer of the assembly is mounted as a simple beam that is bowed to adjust the position of the magnetic transducer suspended therefrom. Because the ends of each piezoelectric transducer of the described assemblies must be movably mounted to permit the piezoelectric transducer to be bowed, extraneous forces encountered by the assemblies can result in erroneous magnetic transducer displacements. Furthermore, the piezoelectric transducer assemblies described in the '726 Patent are not suitable for use in magnetic record/reproduce machines which employ magnetic transducers that are moved or are in motion during record and reproduce operations, especially in machines such as helical scan machines that employ low mass magnetic transducers which are subjected to high "g" forces during such operations.

Accordingly, it is an object of the present invention to provide an improved mounting for adapting a magnetic transducer for controlled positioning use.

SUMMARY OF THE INVENTION

This and other objects are accomplished in the present invention by means of a structure in which the transducer is mounted to a positionable element for displacement substantially transverse to the time axis of signals recorded along the record medium surface (the time axis ordinarily extends in the direction of relative motion of the transducer with respect to the record medium surface). More particularly, the transducer mounting structure is arranged to support the transducer in operative association with respect to the record surface of the record medium to record and/or reproduce signals along paths on the record surface while the transducer and record medium are relatively transported with respect to each other. The transducer mounting structure includes a stable supporting element from which the positionable element extends to support the transducer in operative association with respect to the record surface. The positionable element is of a construction which provides a location from which the transducer is supported in the aforesaid operative association. To permit the transducer to be precisely positioned with respect to paths along the record surface without creating conditions which would permit erroneous transducer displacements, the positionable element is movable in a direction to displace the supported transducer within the predetermined range transverse to the direction of the time axis of signals recorded along the record surface. In addition, the transducer mounting structure is of a construction that restrains the positionable element against motion causing the transducer to be displaced in any manner other than the above-specified transverse direction that would introduce errors in the recording and/or reproduction of signals.

In one preferred form of the invention, a deflectable thin leaf element is cantilevered or hinged proximate one of its opposite ends from the stable supporting element to suspend freely its other opposite end for sweeping motion displacement in a direction lateral to the plane of the leaf defined by its width and length dimensions. The transducer is supported from the leaf's free end to be in the proper operative association with the record medium when in use. To restrict all significant transducer positioning movement of the thin leaf in the lateral direction, the lentgh-to-width aspect ratio of the leaf is selected to be on the order of 2. In addition, the cross section in the width-thickness plane is oblong with the leaf thickness on the order of about 3% of the leaf's width to insure that the leaf has sufficient rigidity against undesirable displacement, mispositioning or movement. Controlled sweeping motion displacement of the thin leaf element is effected by means coupled to the leaf for deflecting it across the path to position the suspended transducer with respect to the record medium. Piezoelectric bender elements and electromagnetically responsive leaf elements are particularly suited for use in the magnetic transducer positionable mounting structure of the present invention.

In helical type rotary scan magnetic recording and/or reproducing machines, the magnetic tape is transported about a cylindrical guide along a helical path as one or more magnetic head transducers are rotated by a rotating carrier to scan the tape. For such applications, it is advantageous to employ a thin leaf piezoelectric bender element to support the magnetic head for controlled positioning with respect to the magnetic tape. The piezoelectric bender element is cantilevered from the rotating carrier, which serves as the stable support, for sweeping or bending motion displacement in response to an applied electric field. The cantilevered element is arranged with the direction of bending motion, as described by its free end, hence supported head, along the path transverse to the direction of relative motion of the head with respect to the magnetic tape. Preferably, the thin leaf piezoelectric bender element extends from the rotating carrier in a plane normal to a plane tangent to the recording surface at the point of head-to-record surface interface and substantially parallel to the direction of relative head-to-record surface motion. The magnetic head is supported from the free end of the piezoelectric bender element for operative engagement with the magnetic tape with its transducing gap oriented to have its gap length in the direction of width dimension of the bender element, hence, of relative motion of the head with respect to the magnetic tape, and its gap width in the direction of thickness dimension of the bender element, hence, transverse to the relative motion direction. In order to respond rapidly to positioning commands and follow changes in such commands, a low mass thin leaf piezoelectric element construction is preferred.

With the magnetic head, piezoelectric bender element and rotating carrier arranged in the foregoing manner, precise continuous positioning of the magnetic head is possible during any mode of the machine operation, including recording and reproducing operations, without creating conditions that permit erroneous transducer displacements. This performance has been achieved by such an embodiment even in the presence of extreme static and dynamic forces found to be acting on the magnetic head in helical scan machines, viz., several orders of magnitude changes in the forces acting on the head as a result of the substantial changes in the coefficient of friction encountered by the magnetic head as it enters and leaves engagement with the helically wrapped tape, the extremely high "g" forces (on the order of 1000) acting on the head as a result of the high rate of rotation of the head, and other extraneous forces that frequently act on the head.

DESCRIPTION OF THE PREFERRED EMBODIMENT

Broadly stated, the present invention is directed to transducer mounting structures in which a transducer is adapted to controlled positioning use where there is relative motion with respect to a record surface. However, the features of the invention are particularly advantageous for segmental recording of data on magnetic tape by means of one or more magnetic heads rotated at a high speed relative to the tape. While there have been many different recording formats that have been developed, the format in which video or other similarly wide band signals are recorded on magnetic tape as it is transported in a helix around a cylindrically shaped scanning drum has exhibited many distinct advantages in terms of relative simplicity of the tape transport drive and control mechanism, the necessary electronics involved, the number of transducing heads, and the efficient use of tape, in terms of the quantity of tape that is required for recording a given amount of material. By helically wrapping the tape around a rotating scanning head, a single transducing head for reproducing or playing the information that is recorded on the tape can be utilized. When a single head is used in a helical tape recording apparatus, two recognized alternatives are available for wrapping the scanning head, and are generally referred to as the "alpha" wrap and the "omega" wrap apparatus.

The alpha wrap has the tape introduced from one side and wrapped completely around the drum so that it exits on the opposite side and is referred to as the alpha wrap for the reason that it generally conforms to the Greek symbol alpha ($\alpha$) when one views the arrangement from above. The omega wrap introduces the tape by bringing it toward the drum in a generally radial direction and passes it around a guide to bring it in contact with the surface of the drum, helically wraps the tape around the drum, passes it around another guide so that it also exists the drum also in a gnerally radial dirction. The tape generally conforms to the shape of the Greek symbol omega ($\Omega$) when it is viewed from above. Both of these configurations are helical wrapped in that the tape is wrapped around the scanning drum in a helical manner with the tape exiting the drum surface at a different axially displaced position relative to the entry thereof. In other words, if the drum is vertically oriented, the tape leaves the drum surface either higher or lower than when it first contacts the surface. The video information signals are recorded on discrete parallel tracks that are positioned at an angle relative to the longitudinal direction of the tape so that a track length greatly in excess of the width of the tape can be achieved. The angular orientation of the recorded tracks are a function of both the speed of the tape being transported around the scanning drum as well as the speed of rotation of the scanning drum itself. The resultant angle therefore varies depending upon the relative speeds of both the rotating scanning drum and tape being transported.

While the present invention will be specifically described in connection with an omega wrap helical video tape recording apparatus, it is equally applicable to an alpha wrap helical tape recording apparatus. Additionally, while the present invention will be described in conjunction with a 360° omega wrap apparatus (it being understood that the tape does not contact the scanning drum a full 360° because of tape entrance and exit dimensional requirements), the present invention is also applicable to helical video tape recorders which utilize less than 360° wrap, e.g., a 180° wrap tape path apparatus having more than one head. It should also be understood that the present invention is applicable to arrangements where the scanning drum can move in either rotational direction and the tape can be introduced either above or below the exit path and moved around the scanning drum in either direction. The relationships of head rotation, tape transport direction and manner of tape guiding, i.e., introducing the tape above or below the path of its exit, can represent up to eight different configurational relationships of which only one will be specifically described herein as shown by the direction of the arrows 19 in FIG. 9 of the drawings.

Figure 1:
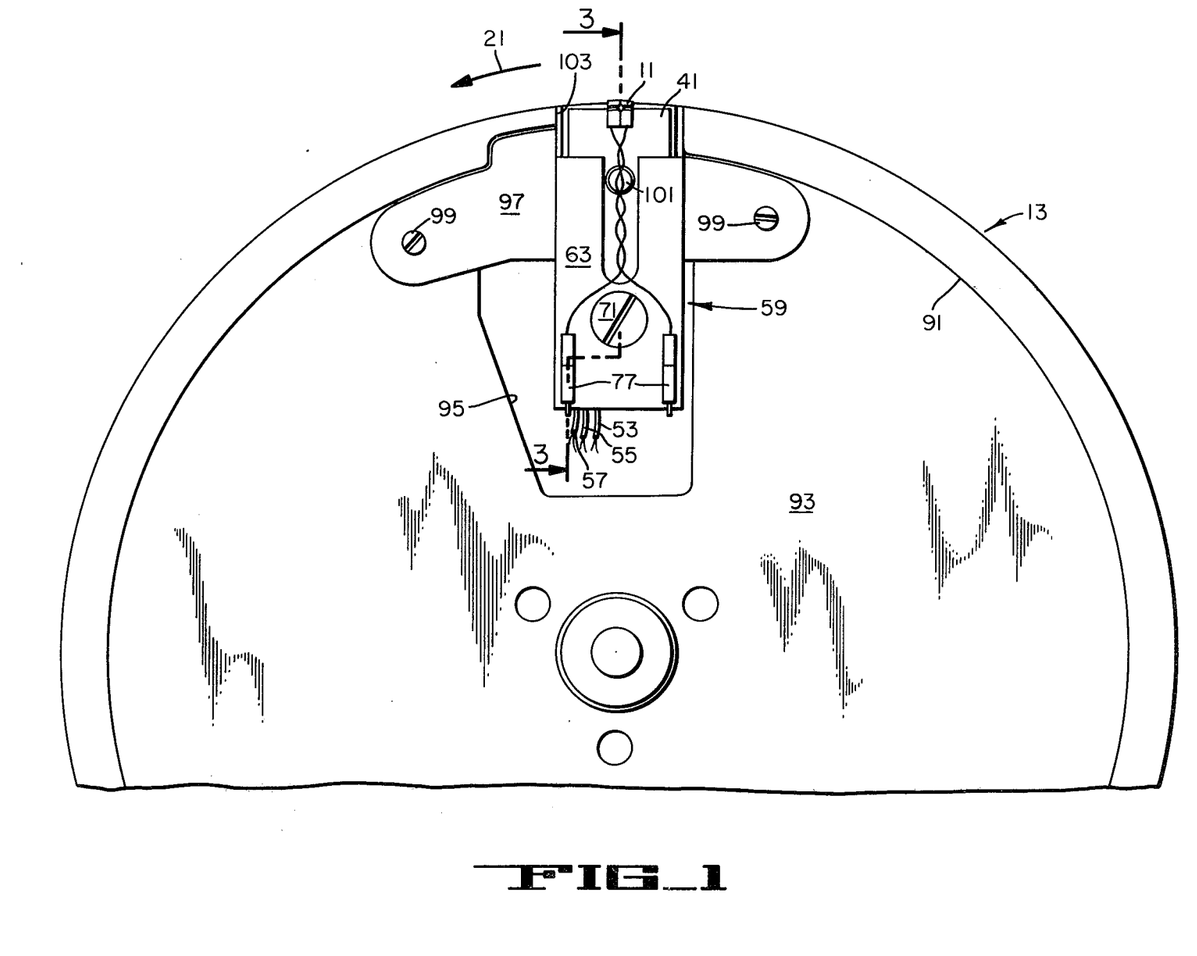
FIG. 1 is a plan view of a magnetic head drum for helical tape recording use, showing the invention mounted thereon.

Referring now to FIG. 1, there is shown a magnetic (head) transducer 11, mounted for recording and subsequently reading an information track upon a relatively moving recording medium. The present invention relates to a novel form of mounting structure for the head 11 that permits precise, continuous positioning of the head, which structure is useful in many different types of recording environments, such as, for example, magnetic drum or disc recording, longitudinal magnetic tape recording as used for computer, audio and instrumentation purposes, transverse rotating head magnetic tape recording for broad band data and/or television signal recording, and helical-scan broad band data and/or television signal magnetic tape recording. However, the structure is found to be especially suited for use in error-free positioning of heads of helical scan type magnetic tape recording/reproducing machines where large forces that act on the heads tend to promote undesirable displacements of the heads movable relative to the rotating head carrier. Therefore, the helical scan type machine as operated in a reproduce mode has been selected for illustrative purposes and FIG. 1 shows a preferred embodiment thereof as intended for use with a single transducer. It is not intended to limit the invention to helical scanning use since the advantages of the invention in such applications are also useful in other applications; however, before describing the actual invention, it will be useful to describe the helical scanning structure shown in FIGS. 1, 3, 8 and 9, and the tracking problems associated therewith, which problems the invention overcomes.

Figures 8, 9:
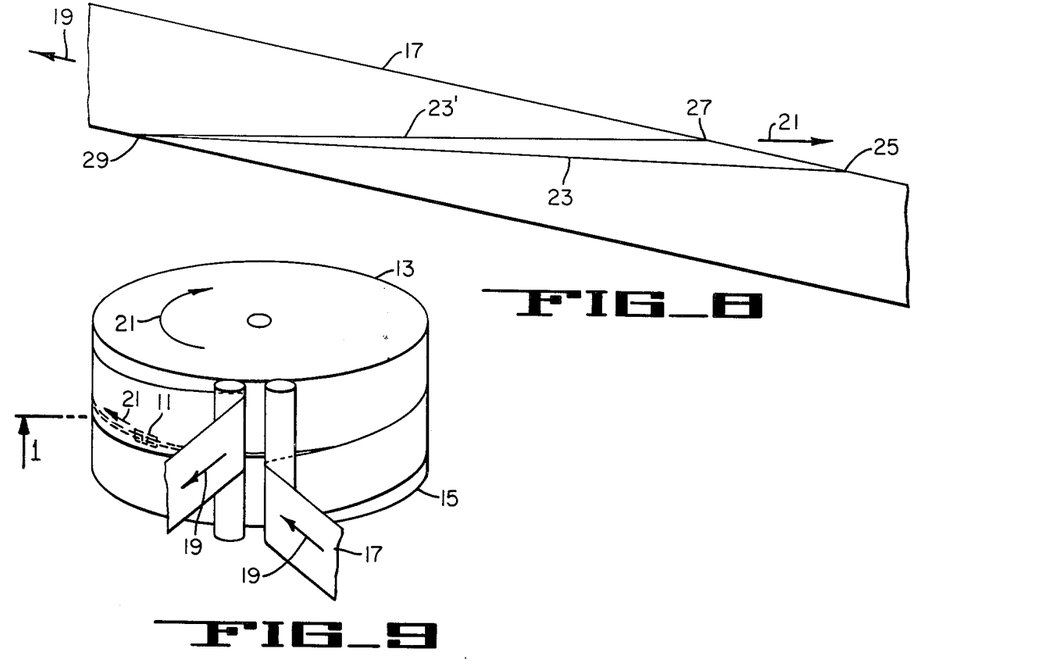
FIG. 8 is an elevation view of a portion of tape.
FIG. 9 is a reduced scale view of the tape of FIG. 8 enwrapped around a scanning mechanism including the structure of FIG. 1.

Briefly, the head 11 can be mounted on a separate support comprising a scanning drum carrier for rotation coaxially between two stationary guide drums, most commonly cylindrical or on a support here shown as a rotatable upper guide drum 13 associated with a stationary lower guide drum 15 as in FIG. 9. A magnetic tape 17 is helically wrapped (i.e., substantially 360°) around the drums 13, 15 for scanning by the head 11. The tape 17 is guided, tensioned and moved (arrows 19) by means not shown but well known in the art so that the head 11 carried by drum 13, rotating in direction 21 opposite the direction of tape transport about the guide drums, scans a series of oblique transverse paths 23 of which only one is shown in FIG. 8. It will be seen in FIG. 8 that point 25 of the tape moves to the position indicated at 27, while head 11 scans the tape between point 29 and point 25. The resultant path on the tape (called "track") is the line 23 from point 29 to point 25. The line 23 may also be termed the "direction of relative movement" between the head 11 and tape 17. In practice, the line or track 23 may be slightly S-shaped, for reasons which have nothing to do with the invention and, therefore, for simplicity of explanation the track 11 is illustrated as being straight. It should be appreciated that if the head 11 rotates in the same direction as that of the movement of the tape about the guide drums 13, 15, point 27 of the tape moves to the position indicated at 25, while head 11 scans between point 29 and point 27. Line 23' becomes the resultant track, however, this change in track position does not alter the implementation of the present invention.

As previously mentioned, the tape is guided under tension so that recording occurs under a recommended standard value of longitudinal tension, which induces a certain degree of stretching of the tape. If the tape is played back at a different tension because of faults in the tensioning mechanism, or because of unavoidable variations in the mechanisms of different machines, then the length, straightness and inclination of track 23 will be different, and the head 11 will not perfectly follow the track, leading to undesirable variations in the strength of the reproduced signal and other problems. A similar effect results if the correct tension is used on playback, but the tape has shrunk or elongated due to changes in atmospheric or storage conditions, e.g., temperature or humidity. Also, irregular tape edges and differences in edge-guiding effects from machine to machine, can cause irregularly wandering tracks or scans.

Accordingly, the invention relates to the mounting of the head 11 on an extremely low-mass deflectable element, to enable it to be moved rapidly, substantially lateral to a desired track, such as a track of recorded information on a magnetic medium, while at the same time the head and its entire mounting is moved, or the recording surface is moved, or both are moved, in such a way that there is relative motion between the head and the recording surface in the direction of the desired track. This is the condition in which the head scans or follows the desired track. In one embodiment of the present invention, the deflectable mounting is a thin leaf lying substantially in a plane that is normal to a plane tangent to the recording surface at the point of head-to-record surface interface and substantially parallel to the direction of relative motion.

Figure 2:
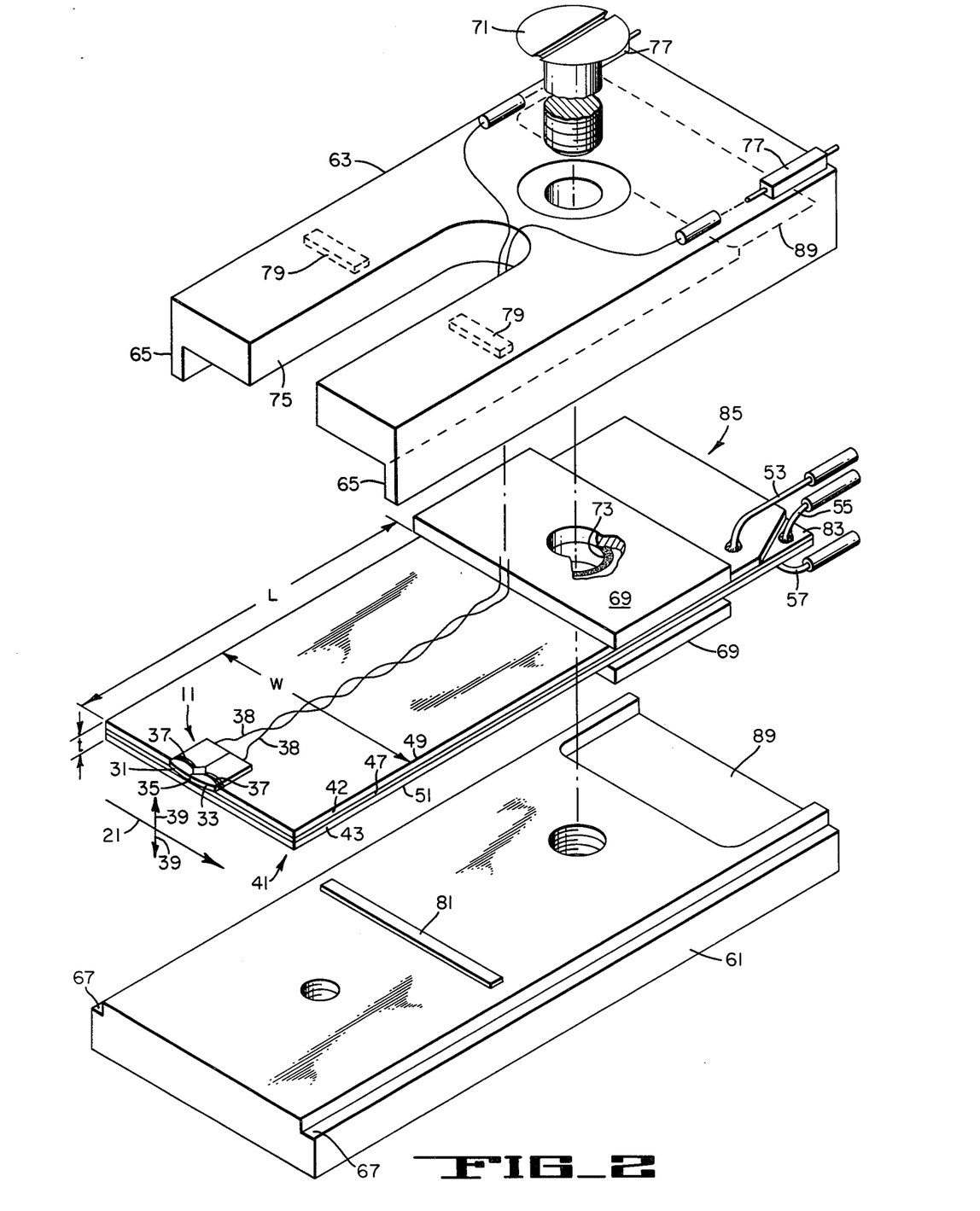
FIG. 2 is an exploded perspective view, to an enlarged scale, of a portion of the structure shown in FIG. 1.
Figures 3, 4, 5:
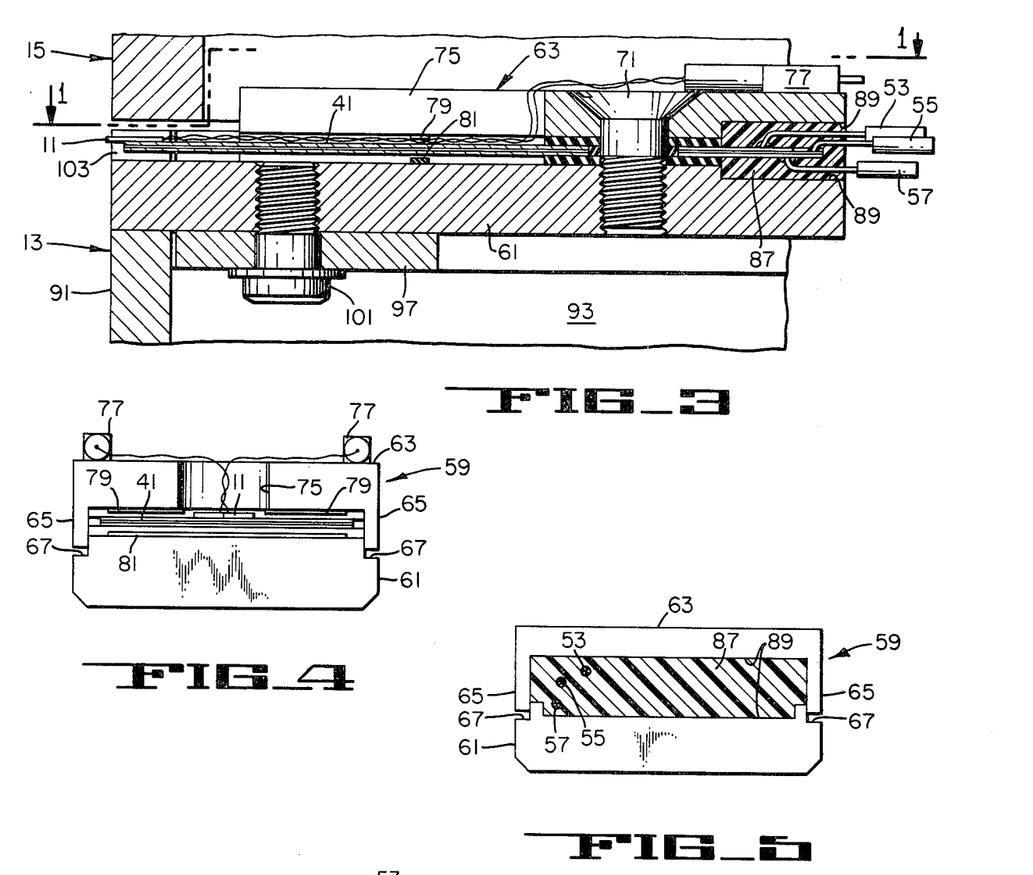
FIG. 3 is an enlarged sectional view taken on the plane of lines 3—3 of FIG. 1.
FIG. 4 is a left-end elevation view of a portion of the structure shown in FIG. 3.
FIG. 5 is a right-end elevation view of a portion of the structure shown in FIG. 3.

It should be understood that the details of the means by which the amount and direction of actual deviation from the desired track for the head is sensed, in relation to the head-to-tape path that is normally followed, and the operatively associated energizing means by which the head mounting is caused to laterally deflect in response to the sensed deviations so that the head follows the desired path are not parts of the present invention, but are subject of and described in the above-mentioned co-pending applications. Continuing now the description of the exemplary embodiment, it will be seen from FIG. 9 that the head 11 is fitted to the lower portion of drum 13. The view of FIG. 1 is therefore taken from the bottom of drum 13, looking upward, as illustrated by the arrows 1—1 of FIGS. 9 and 3, and the views of FIGS. 2 and 3 are also taken upside down, i.e., with the drum 13 below and the drum 15 above, for the purpose of making the description easier to follow.

Head 11 is extremely small and of low mass (on the order of 100 milligrams), and consists of two pole pieces 31 and 33, confronting one another across a non-magnetic transducing gap 35 for recording and/or reproducing signals with respect to the tape. The gap 35 is aligned with the length thereof substantially parallel to the direction 21 of drum 13 movement relative to the tape 17. It will be understood that in the magnetic recording art the "length" of the gap is the dimension from pole face to pole face, in the direction of relative recording motion. Usually, the "width" of gap is aligned transversely to the relative motion direction and parallel to the recording surface, and the "depth" of the gap is normal to the recording surface. If for any reason the gap is inclined to the direction of relative motion, the length is still defined (at least for purposes of this invention) to be in the direction of relative motion, while the width and depth dimensions are still taken as being orthogonal to the length. Signals are carried to or from the head 11 by means of poles piece windings 37 and leads 28. Signals are coupled between the magnetic head 11 and the recording surface passing the gap 35 through a coupling path that extends between the two pole pieces 31 and 33 through the recording surface in the direction of relative motion, hence the desired track on the surface.

To provide for tracking movement of the head 11 transverse (arrows 39) to the direction 21 of the drum 13 movement, the head is mounted or bonded, as by epoxy, to one flat side of a positioning member including a thin deflectable leaf element 41, here shown by way of example as a piezoelectric ceramic bender element. In the embodiment of the invention discussed in detail hereinafter with reference to the drawings, the positionable element includes a cantilever mounted piezoelectric ceramic bender element either manufactured by Vernitron Corp. and identified as PZT-5HN Bender Bi-Morph Poled For Parallel Operation or by Gulton Industries and identified as G 1278 Piezoceramic Bender Element Poled For Parallel Operation. As shown in greater detail in FIG. 6, the leaf element 41 is composed of two piezoelectric ceramic members 42 and 43, sandwiched and bonded between electrode members (nickel or silver) 49, 49A, 51 or 51A and conductively bonded as by epoxy layers 44 and 45 to opposite sides of a brass vane member 47. The ceramic members 42, 43 are cut and oriented with their axes of polarization vertically aligned (i.e., parallel to arrows 39 in FIG. 2). As is well-known in the bender art, the direction of polarization of the respective ceramic members may be either the same or opposed, depending upon how the electrodes 49, 51 and the brass vane 47, which may also be used as an electrode, are energized.

For protective purposes, the leaf 41 is mounted in an open-end housing 59 composed of a base shoe member 61 and a cover member 63 having two side walls 65 fitting on shelves 67 of the shoe 61. The leaf 41 is solidly mounted between two electrically insulating spacers 69 by means of a bolt 71, which passes through the cover 63, the leaf 41, both spacers 69, and is threaded into shoe 61. The bolt 71 is insulated from the leaf 41 by means of an electrically insulating collar 73 between the spacers 69. To provide access to the head 11 and leads 38, the cover 63 is made shorter than the shoe 61 and is cut away in an upper slot 75, the leads 38 having terminals 77 mounted on the upper inner end of cover 63. Because a low mass is desired for the leaf 41, damping may be necessary or desirable. In such event, to provide damping and thereby lower resonant frequency for the leaf 41, and to act as limit stops or restraints, the cover 63 and shoe 61 may be provided with so-called dead-rubber pads 79, 81, respectively, which absorb impact without immediate rebound (see also FIG. 4). These restraints serve to prevent undesirable movement of the supported head 11 that could introduce errors in the recording and/or reproduction of signals.

Figure 6:
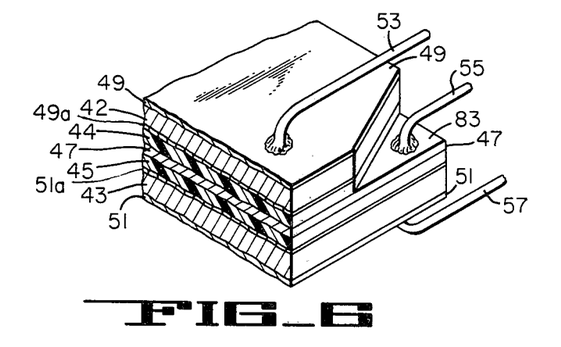
FIG. 6 is an enlarged fragmentary perspective view illustrating a portion of the structure shown in FIG. 3.

Leads 53, 55, 57 extend respectively from elements 49, 47, 51 for coupling a voltage source to establish an energizing electric field in the elements and may be formed as shown in FIG. 6, in which a corner of each inwardly-extending leaf end layers 49, 42 and 44 is cut away to leave a soldering shelf 83 for attaching the lead 55 to the brass vein electrode 47, while the leads 53 and 57 are soldered respectively to electrodes 49 and 51. However, this arrangement requires a certain extension 85 (FIG. 2) of the electrodes, and in fact of the leaf 41, radially inwardly of the spacers 69, away from the head 11. In order to prevent such extension 85 from responding to harmonic vibrations of the drum driving motor, and other external vibration sources, and thus upsetting the fine control of the movement of leaf element 41, the entire extension 85 is potted between the shoe 61 and cover 63 as illustrated in FIGS. 3 and 5, in which the non-conductive potting compound (e.g., epoxy) is represented by reference numeral 87. The cover 63 and shoe 61 may be cut away to define an enlarged potting chamber 89 for this purpose.

The assembled leaf element 41 and housing 59 are mounted on the drum 13 as shown in FIGS. 1 and 3. Drum 13 is provided with a cylindrical peripheral flange 91 and a central radial web 93. Because the drum 13 bears only one head 11 as in the 360° wrap configuration, the drum web 93 and part of the flange 91 are cut away to define an opening 95 to counterbalance the mass of the head 11 and its mounting means. A bracket 97 is mounted in bridging relation across the opening 95, as by means of bolts 99. The shoe 61 is mounted on the bridging bracket 97 as by means of a bolt 101, with the shoe 61 extending toward the peripheries of the drums 13 and 15 to leave nothing protruding beyond these peripheries but the tip of head 11 extending through the cut away portion 103 of the flange 91.

For optimum performance, the dimensions and proportions of the leaf 41 are carefully selected for the particular application intended. The leaf material is available commercially and is obtainable in various standard thicknesses, which can be cut to desired length and width dimensions. The selection of dimensions and proportions is made according to the desired leaf element displacement sensitivity, range and response, desired resonant frequency, desired purity of leaf element motion, and desired structural rigidity so that the free end of the leaf element 41 (i) is permitted to move along a desired path that results in the controlled displacement of the suspended magnetic head 11 in a direction relative to tape 17 that moves the head's recording/reproducing gap 35 transverse to the time axis of signals recorded along the tape and (ii) is restrained against movement that would result in the gap 35 of the head 11 moving in any substantial or significant manner, particularly with a component in the direction of the time axis, that would introduce undesirable timing errors in the recording and/or reproduction of signals. While longitudinal displacement of the free end of the leaf relative to the tape occurs in the direction of the length dimension of the leaf as it is deflected transverse to the time axis, it does not have a significant effect in coupling signals between the tape and magnetic head. For example, in the embodiment discribed below including a leaf element having a length dimension, L, of 2.4 cm., the free end of the leaf moves less than 0.0001 cm. for a typical deflection of ±0.024 cm. Such longitudinal displacements of the free end of the leaf do not have a component along the time axis of signals recorded along the track and can be ignored for purposes of this invention. In helical scan machines, the time axis of signals recorded along the tape 17 lies along the path scanned by the head 11 illustrated by line 23 in FIG. 8. More particularly, the leaf element 41 should have a length, L, (the suspended portion measured from spacers 69 to the free leaf end at head 11) to width, W, aspect ratio that restrains the element 41 against any movement in the width dimension or against any torsional movement about the length-width plane of the element 41 that would give rise to an undesirable displacement of the suspended head 11 having a component along the time axis or line 23. Undesirable displacements that are to be particularly avoided are those that would introduce unacceptable azimuth and time base errors in the recording and reproducing of signals. For signals in the color television video frequency range, displacement along the time axis or line 23 should be limited to less than 0.13 microns in order to avoid such errors. On the other hand, it is preferred that the length-to-width aspect ratio not be so small as to unduly limit the possible head displacement range for a practical drive voltage used to control the displacement of the element 41. For example, for a head displacement range of ± 0.025 cm., a length-to-width aspect ratio of 2 is the most suitable. As the aspect ratio is increased, the leaf element 41 becomes less rigid in the width dimension and, eventually, is able to move in a direction having a component along the time axis or line 23 causing unacceptable azimuth and time base errors. As the aspect ratio is decreased, the leaf element 41 does become more rigid in the width dimension. But, the drive voltage must be increased for a given head displacement, eventually to levels that become impractical, particularly, for the rates of displacement cycles necessary to maintain the error-free tracking that the present invention is intended to provide for helical scan applications.

The thickness, t, of the leaf element 41, is selected, in the preferred embodiment described herein, to provide good sensitivity, i.e. displacement per unit drive voltage, sufficiently high resonant frequency to permit the element 41 to be displaced at desired high rates below the resonant frequency, purity of leaf element motion and a practical voltage limit for the desired maximum displacement rate and range. For example, for a displacement rate of up to about 200 displacement cycles per second over a range of ± 0.025 cm., a thickness on the order of 3% of the width dimension of the element 41 is suitable. While leaf elements of smaller thicknesses are characterized by greater sensivitity, they also have a lower resonant frequency. As the rate of leaf displacement approaches a resonant frequency, the leaf displacement exhibits marked changes from displacements at frequencies either side of the resonant frequency. Such marked displacement changes make control of the position, hence tracking of the leaf element 41, exceedingly difficult. The opposite is the case for leaf elements of greater thickness, i.e., decreased sensitivity and higher resonant frequency. Further, thicker leaf elements require higher drive voltages for a desired displacement range and rate. Torsional displacements giving rise to unacceptable time base and azimuth errors are further restrained by constructing the leaf element 41 to experience a pure bending motion type displacement when subjected to an energizing electric field. Such displacement is achieved by constructing the leaf element 41 to have a uniform thickness over its length. A thickness uniformity along the leaf's length of ± 10% of the thickness design value provides excellent restraint against unacceptable torsional displacements.

The positionable head mounting structure of the present invention is further characterized as being capable of a very low mass (1.5 grams is a typical example) construction. The low mass construction is possible because the structure utilizes a single thin leaf positionable element 41, from which is suspended a magnetic head 11 of relatively negligible mass. The low mass characteristic of the structure facilitates the rapid displacement of the head 11 under carefully controlled conditions whereby it can be precisely positioned to follow a desired path along the magnetic tape 17. Furthermore, it enables the positionable head mounting structure to be used in rotary scan record/reproduce machines, such as helical scan machines of the kind in current commercial use.

In one embodiment of the positionable head mounting structure used in a helical scan machine, the leaf element was constructed to have a thickness, t, of 0.05 cm., and an extension (or length, L,) dimension of 2.4 cm. in order to provide a resonant frequency of about 400 deflection cycles per second. The width of the leaf element 41 was selected to be 1.27 cm., a value that provided adequate stiffness or rigidity in the direction of the scan of the head 11 over the tape 17 (or time axis of the signal recorded along the tape), considering the frictional drag created by the tape, and the repeated extremely large impulse change in the frictional forces acting on the head 11 as it enters and leaves each scan of the tape 17. Particularly to be avoided is an effect of twisting of the leaf about its longitudinal axis, which would cause a skewing effect of the head with respect to the tape. The dimensions selected were found satisfactory to avoid skew.

Figure 7:
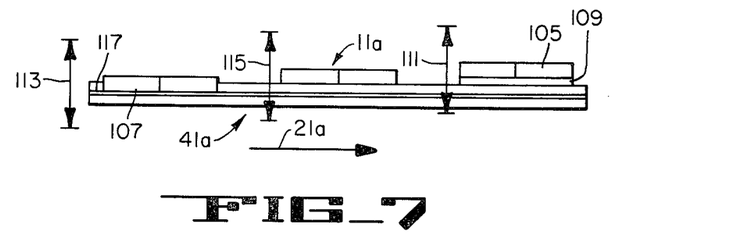
FIG. 7 is an enlarged left-end view of a portion of the structure shown in FIG. 3, illustrating an arrangement of a plurality of transducers thereon.

For some applications, it may be desirable to mount a plurality of magnetic transducers on the positionable element. For example, FIG. 7 illustrates an application in which a pair of left-offset and right-offset track sensing magnetic heads 105 and 107 are employed to monitor continuously the position of a single record/reproduce magnetic head 11a relative to a recorded track and provide information that is used to control the position of the record/reproduce head. The construction and implementation of this embodiment for controlling the position of a single record/reproduce head is described more fully in my above-referenced copending U.S. application, Ser. No. 668,571. The single record/reproduce head 11a is mounted just as is head 11, while track sensing heads 105, 107 are mounted on either side of head 11a, but are oppositely staggered transversely to the direction of motion 21a, so as to sweep, respectively, left-offset and right-offset zones 111 and 113 that overlap the middle zone 115, which corresponds to the expected range of track displacement of head 11a. As shown in FIG. 7, record/reproduce head 11a is mounted directly on the surface of the leaf 41a for sweeping a range of displacements represented by middle zone 115. Left-offset track sensing head 105 is mounted on a spacer element 109 fastened to the surface of the leaf 41a, the thickness of the spacer 109 being less than the width of the head 11a so that the sensing head 105 is spaced above the head 11a by an amount less than the width of the head 11a. Right-offset track sensing head 107 is mounted on a recessed mounting shelf 117 provided by cutting away leaf 41a at the corner, somewhat as in FIG. 6. Mounting shelf 117 is recessed below the surface of leaf 41a a distance equal to the thickness of the spacer 109 so that the sensing head 107 is spaced below the head 11a by an amount less than the width of the head 11a. With the track sensing heads 105, 107 mounted in the aforedescribed manner relative to the record/reproduce head 11a, the paths scanned by the sensing heads always overlap the edges of the path scanned by head 11a as it is displaced through the expected range 115 of track displacement. In the event the path scanned by the head 11a is a recorded track of information, the sensing heads 105, 107 reproduce information from the overlapped edges of the recorded tracks as they follow the record/reproduce head 11a. Alternatively, the sensing heads 105, 107 may be made narrower in width (i.e., transverse to direction of motion 21a) than head 11a, so as to have less overlap upon the path scanned by head 11a, or even zero overlap. However, the heads 105, 107 preferably do not extend laterally beyond the dimension of the guard bands flanking the recorded track, when the head 11a is correctly following the track, and thus heads 105, 107 do not ordinarily read parts of adjacent tracks. With regard to other structural features of the transducer mounting structure of FIG. 7, such as, for example, a housing, head windings, electrical leads, and restrains, they may be constructed similarly as described with reference to the embodiment of FIGS. 1 through 6.

Figure 11A:
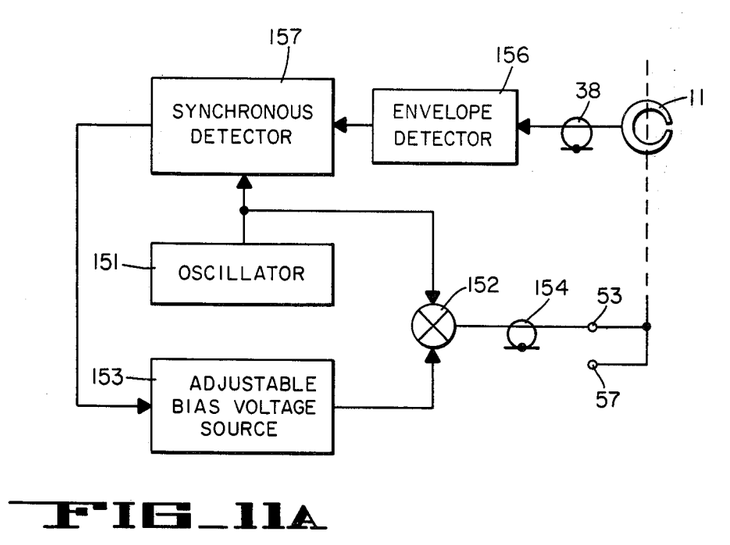
FIGS. 11A and 11B are schematic block diagrams of alternative embodiments for sensing and controlling the position of supported transducers relative to a record surface.
Figure 11B:
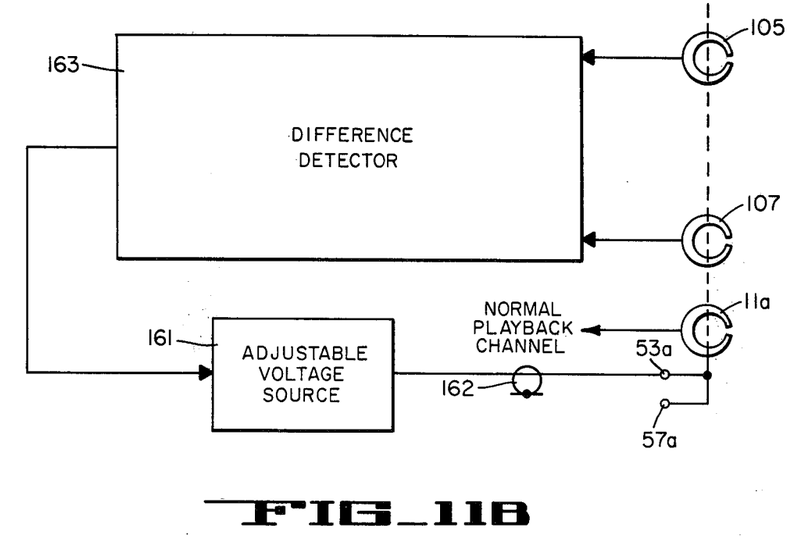

FIGS. 11A and 11B illustrate, in schematic block diagram form, embodiments of means for sensing the position of the record/reproduce head relative to a desired path along a record surface, such as a recorded track of information, and generating a suitable signal for actuating the positioning element by, for example, energizing the piezoelectric members, 42 and 43 for displacement to control the position of the head so that it follows the path or recorded track. The embodiment of FIG. 11A is for use with the magnetic transducer mounting structure embodiment illustrated by FIGS. 1 through 6 and utilizes a dithering technique to sense and control the position of the record/reproduce head 11. The embodiment of FIG. 11B is for use with the magnetic transducer mounting structure embodiment illustrated by FIG. 7 and utilizes a track following technique described in detail in my above-referenced copending U.S. application, Ser. No. 668,571, to sense and control the position of the record/reproduce head 11a. Considering first the position sense and control embodiment of FIG. 11A as employed with the mounting structure embodiment of FIGS. 1 through 6, an oscillator 151 is operated to provided at its output a fixed frequency alternating dither signal, which is coupled to the leaf element 41 causing it to vibrate within a displacement range. Before coupling to the leaf element 41, the dither signal is coupled to one input of a voltage summing circuit 152 to be algebraically summed with a voltage control signal provided by an adjustable bias voltage source 153 and coupled to a second input of the summing circuit. The resulting summed dither and control signal provided at the output of the summing circuit 152 is coupled by line 154 to be applied between the two leads 53 and 57 so that the summed signal is impressed across the entire leaf element structure. If the summed signal is to be applied to leaf element 41 with reference to the brass vein electrode 47, the other electrode 55 is required. One of the electrodes, for example, 51 connected to the lead 57 serves as a reference for the applied summed signal.

The dither signal component of the applied summed signal causes the leaf element 41 to vibrate over the selected range as the suspended head 11 is operated to reproduce signals recorded along the track, such as represented by line 23. This vibration causes an amplitude modulation of the envelope of the reproduced signal. When head 11 is located in the proper track position at the center of the track 23, the amplitude modulation of the reproduced signal is at a minimum and increases to a maximum as the head 11 is displaced to one side or the other of the track center. Thus, minimum peal-to-peak values of the signal envelope occur when the head 11 passes through track center and greater peak-to-peak signal envelope values occur when the head 11 is displaced to one side or the other of the track center. With the head 11 in the proper track position, the frequency of the envelope variation is twice the frequency of the dither signal component. However, with the head 11 to either side of the proper track position, the maximum-to-minimum envelope amplitude variation occurs once for each cycle of the dither signal component, or at the dither signal frequency, with the order of occurrence of the maximum and minimum points depending upon the side of track center to which the head 11 is offset. Detection of the order of occurrence of the maximum and minimum points provides information definitive of the direction the head 11 is offset from the center of track 23 and detection of the envelope amplitude variation provides information definitive of the amount of offset.

To obtain this track offset information, leads 38 of the head 11 are coupled to the input of an envelope detector 156. The detector provides a signal representative of the amplitude modulated envelope component of reproduced signal at the frequency of the dither signal. This signal is coupled to a control input of synchronous detector 157 for phase and amplitude comparison with the dither signal provided by the oscillator 151 and coupled to a reference input of the detector 157. The detector 157 is responsive to the input signals to generate an output signal having an amplitude proportional to the amount head 11 is offset from track center and a polarity representing the direction of the offset. This output signal is provided to the input of the adjustable bias voltage source 153 to adjust the voltage level of the control signal in accordance with the amplitude and sense of the output signal. Source 153 is responsive to the output signal to generate a control signal whose voltage level follows the amplitude and sense variations of the output signal so that the positioning leaf element 41 is energized to compensate for detected track offsets of the head 11 upon application of the summed control signal and dither signal.

With reference to the track following embodiment of FIG. 11B as employed with the transducer mounting structure embodiment of FIG. 7, it includes an adjustable bias voltage source 161 that provides a control signal at its output, which is coupled by line 162 to leads 53a and 57a to be applied, as in the embodiment of FIG. 11A, across the entire leaf element structure 41a. Two inputs of a difference detector 163 are respectively coupled to receive the signals reproduced by the sensing heads 105, 107. The difference detector 163 compares the average amplitudes of the reproduced signal envelopes and provides an output difference signal whose amplitude is proportional to the difference in the average amplitudes and whose sense is representative of which of the average amplitudes is the largest. When head 11a is located in the proper track position at the center of the track 23, the average amplitudes of the signals reproduced by the sensing heads 105, 107 are equal. Thus, the output signal of the difference detector will be zero, or correspond to the desired track position for head 11a. However, as the head 11a is displaced from track center in the direction of the left-offset track sensing head 105 (see FIG. 7), the average amplitude of the signal envelope reproduced by the sensing head 105 proportionately decreases while that reproduced by the right-offset track sensing head 107 proportionately increases. The contrary occurs as the record/reproduce head 11a is displaced from track center in the direction of the right-offset track sensing head 107, i.e., the average amplitude of the signal envelope reproduced by the sensing head 107 proportionately decreases while that reproduced by the sensing 105 proportionately increases. The difference detector 163 is responsive to such proportionately changing signals to generate a difference signal whose amplitude follows the amplitude difference of the signal envelopes reproduced by the sensing heads 105, 107 and whose sense is dependent upon which of the signal envelopes has the greatest average amplitude. This difference signal is provided to an input of the adjustable bias voltage source 161, which is responsive to adjust the voltage level of the control signal in accordance with the amplitude and sense of the difference signals so that, upon its application to the positioning leaf element 41a, the element is energized to compensate for detected track offsets of the head 11a.

Figure 10:
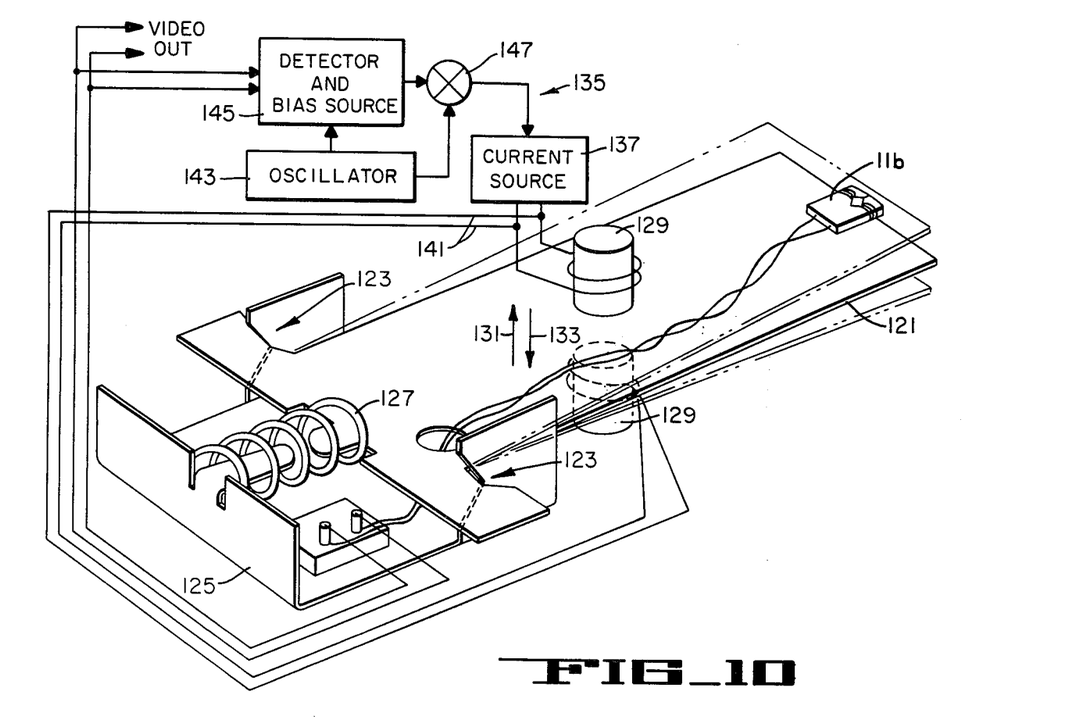
FIG. 10 is an enlarged perspective view, partly in schematic form, of an alternative embodiment of the invention.

An alternative arrangement for mounting the transducer is shown in FIG. 10. In this example, the leaf element 121 is not piezoelectric but is made of magnetically-permeable material, and is arranged to pivot from a stable support, rather than bend, provided by means of a pair of widely-spaced knife-edge type hinges 123 formed between the leaf 121 and a base member 125 with the leaf 121 loaded against a base 125 by means of a compression spring element 127 extending between the leaf and the base. Head 11b is mounted at the end of the leaf 121. The base 125 also includes a pair of electromagnets 129 positioned, by suitable retaining means (not shown), on opposite sides of the leaf for producing a magnetic field through the leaf 121 in a direction 131 (or 133) that is normal to the plane of the leaf. Drive means 135 for energizing the electromagnetics to position the leaf 121 are schematically shown.

The embodiment illustrated by FIG. 10 utilizes a dithering technique like that described with reference to FIG. 11A for controlling the position of the leaf 121 at its head end. More specifically, the leaf 121, and its pivoted support structure, is made of magnetically permeable material. The drive means 135 includes a current source 137 that delivers over lines 139, 141 a summed dither and control current signal to the exciting coils of the electromagnets 129. For convenience, the windings of the coils are wound about the cores of the electromagnets in opposite phase senses so that opposite magnetic poles are established at the facing surfaces of the cores. This permits the same phased current signal to be used for exciting both coils to control and vary the position of the leaf 121.

As in the embodiment of FIG. 11A, an oscillator 143, detector and bias source 145 and summing circuit 147 are operatively associated together and coupled to receive the signal reproduced by the head 11b and generate a summed dither and bias control signal for application to the control input of the current source 137. The oscillator 143 generates the fixed frequency alternating dither signal for exciting the electromagnet coils to vibrate the leaf 121 within a determined displacement range. The bias control signal determines the current level about which the current signal provided by source 137 is made to vary at the dither signal frequency and has an amplitude determined by the amplitude variation at the dither frequency of the signal envelope reproduced by the head 11b and by the order of occurrence of maximum and minimum envelope amplitude points.

While the transducer mounting of the present invention has been described particularly in relation to magnetic helical scan applications, it will be apparent that the positionable transducer mounting is equally well adapted for use with other signal recording systems employing transducers other than magnetic heads. Also, other types of record medium scanning apparatus may be used, such as transverse scan apparatus, magnetic discs and magnetic drums, and logitudinally recorded tapes. For transverse scan, the head, or an appropriate number of them, may be mounted in a similar manner on the scanning drum. In the magnetic drum and disc art, the mounting is well adapted to enable the head to follow apparent track irregularities that may be caused by wobble or run-out, such as may, in turn, be caused by eccentric or axially misaligned drums/discs or mis-alignment of the head moving mechanism. In longitudinal recording, the head mount of the invention permits the head to follow apparent track irregularities such as may be caused by mis-alignment of the tape guides or head mounting base, or simply by wavy tape edges engaging well-aligned guides when the tape has shrunk or expanded after having been recorded. For parallel channel recording applications, more than one record/reproduce head can be supported from a single positioning element.

What has been described is the adaptation of a magnetic transducer to automatic tracking use in association with a relatively moving magnetic recording surface such as a magnetic tape, drum or disc, the transducer being supported from a positioning element for displacement lateral to the time axis of signals recorded along the record surface, commonly, the direction of relative motion with respect to the record surface, while restrained against deleterious displacement along the time axis. For applications in which the transducer is to follow a previously recorded track, the transducer is displaced with a predetermined range corresponding to the expected range of track deviation on the record surface.

I claim:

1. A magnetic head assembly for use in a recording and/or reproducing apparatus in which a magnetic head is carried by a rigid support element in transducing relation with a magnetic record medium for recording and/or reproducing information with respect to an elongated track on the magnetic record medium during periods of relative motion between the magnetic head and the record medium, comprising:
   a controllable positioning member with said magnetic head mounted at a location thereon to be positioned in transducing relation with the elongated track;
   said controllable positioning member being attached to said support element so as to be substantially fixed with respect thereto against bodily translation; and
   said controllable positioning member being movable at said magnetic head location for traversing motion displacement of the mounted magnetic head laterally away from said track, with each portion of said positioning member being laterally displaced to a degree that is a function of the first exponential power of the position of said portion along that dimension of said member that is generally most normal to the record medium surface; and
   said positioning member being substantially rigid in directions orthogonal to said lateral displacement.

2. The assembly recited in claim 1, and also including: means coupled to said controllable positioning member for controlling said traversing motion thereof.

3. The assembly recited in claim 1, wherein:
said controllable positioning member has a base portion attached to the rigid support element so as to be fixed with respect thereto against bodily translation and against bodily rotation in at least all but the lateral displacement directions;
said head mounting location of controllable positioning member being displaced from the base portion.

4. The assembly recited in claim 3, wherein:
said base portion of said member is fixed against all movement with respect to said support element; and
the portion of said member that includes said head mounting location being formed and dimensioned for bending deflection only in said lateral directions.

5. The assembly recited in claim 1, wherein said rigid support element and said magnetic record medium have relative motion in a direction that may deviate for a pedetermined range lateral to said track from the elongate direction of said track; and
said controllable positioning member is laterally displaceable for at least said predetermined range.

6. An assembly as described in claim 1, wherein:
said controllable positioning member is a thin leaf element with a leaf length dimension normal to the magnetic record medium and in a direction extending from the support, a leaf width dimension extending generally in the elongate direction of said track and normal to the leaf length dimension, and a leaf thickness dimension orthogonal to the leaf length and leaf width dimensions, said leaf dimensions selected to minimize twisting of said leaf element about its major axis extending in the direction of the leaf length dimension.

7. An assembly as described in claim 6, wherein:
said controllable positioning member is a piezoelectric bender element having axes of polarization extending in said lateral directions.

8. An assembly as described in claim 7, wherein:
said leaf element is formed of two piezoelectric ceramic plates bonded to an intervening substrate and sandwiched between two electrodes.

9. An assembly as described in claim 8, wherein:
said piezoelectric ceramic plates are arranged to have oppositely directed axes of polarization and electric leads are coupled to said two electrodes for the application of driving potentials thereto.

10. An assembly as described in claim 9, wherein:
said substrate is also an electrode having an electric lead coupled thereto for the application of a driving potential thereto.

11. An assembly as described in claim 6, wherein:
said leaf element has a length dimension that is substantially twice the width dimension thereof.

12. An assembly as described in claim 6, wherein:
said magnetic head has a pair of pole pieces confronting one another to define a magnetic transducing gap having a length dimension extending in the direction of the leaf width dimension, a width dimension extending in the direction of the leaf thickness dimension and a depth dimension extending in the direction of the leaf length dimension.

13. An assembly as described in claim 1, wherein:
said controllable positioning member is a thin leaf element that is pivotably mounted on said support element for said lateral displacement.

14. An assembly as described in claim 13, wherein:
said leaf element is made of magnetically permeable material; and
electromagnet means is positioned adjacent to said leaf element for producing a magnetic field for pivotal movement of said leaf in said lateral displacement.

15. An assembly as described in claim 1, wherein:
said controllable positioning member is a thin leaf element that is mounted in a protective housing mounted on said support element, said housing having walls defining an opening for protrusion of said magnetic head, and having interior dimensions chosen to permit the free sweep of the extremity of said leaf and of the magnetic head mounted thereon in said lateral directions to traverse said track but to cause the walls of said housing to act as limit stops to prevent excessive sweeping motion of said leaf and transducing head.

16. An assembly as describe in claim 15 wherein:
resilient damping pads are disposed within the housing to confront opposite sides of said leaf element and limit the sweeping excursions thereof without causing damage to the leaf element.

17. An assembly as described in claim 1, wherein:
said conrollable positioning member is a thin leaf element with a leaf length dimension normal to the magnetic record medium and in a direction extending from the support, a leaf width dimension extending generally in the elongate direction of said track and perpendicular to the leaf length dimension, and a leaf thickness dimension orthogonal to the leaf length and leaf width dimensions, said leaf element having a length-to-width ratio on the order of two, and said leaf element having a thickness on the order of three percent of its width.

18. An assembly as described in claim 17, wherein:
said leaf element has a uniformity of thickness along its length of ± 10%.

19. A rotary scanning assembly for use in a recording and/or reproducing machine utilizing magnetic tape, comprising:
scanning means adapted to be mounted for rotation in scanning relation with said tape;
a controllable positioning member mounted on said scanning means in scanning relation with said tape with at least a portion of said positioning member extending substantially in a plane that is normal to said tape and that is substantially parallel to the direction of relative motion between said tape and said positioning member, said positioning member being substantially rigid in said plane parallel to said direction of relative motion;
said portion of said positioning member being adapted to receive a magnetic transducer means and hold it in position to be in transducing relation with a track on said tape; and
at least said portion of said positioning member being relatively thin and being deflectable in a direction substantially normal to said plane and transverse to said direction of relative motion so that the held magnetic transducer sweeps a predetermined range of deviations from said track on said tape;
said positioning member being formed as a piezoelectric leaf with length on the order of from two to three centimeters, width on the order of half the length, and thickness on the order of 4% of the width and varying less than 10% throughout said length.

20. A rotary scanning assembly as described in claim 19, wherein:
said scanning means includes a rotating scanning drum adapted to be mounted for rotation about its principal axis;
said controllable positioning member being mounted on said scanning drum on the side thereof; and
said scanning means being arranged for guiding said tape in a helical wrap about said drum so that the magnetic transducer means held by said controllable positioning member scans said tape in oblique transverse paths.

21. A rotary scanning assembly as described in claim 20, wherein:
said scanning drum is formed with a cylindrical peripheral flange portion and a central radial web portion;
said web portion is cut away in the vicinity of said controllable positioning member to dynamically counterbalance the mass of said assembly; and
said flange portion is cut away to permit protrusion of said magnetic transducer means held by said controllable positioning member.

22. A rotary scanning assembly as described in claim 19 and further comprising:
a magnetic head transducer having pole pieces confronting one another to define a non-magnetic transducing gap extending therebetween for a selected length, said magnetic head secured to a controllable positioning member to have its non-magnetic transducing gap in position to be in transducing relation with the magnetic tape with the length dimension of the gap extending in a direction parallel to said plane of said controllable positioning member.

23. A head positioning member adapted for use in a structure for mounting a magnetic transducing head on a support means within a transport and in transducing relation with a track on a magnetic recording medium carried by said transport, said member and said head each having first, second and third orthogonally related axes that are respectively, parallel to the length of the track and in centered relation therewith, lateral to the track, and normal thereto, when said head is in said transducing relation, characterized in that:
said member is adapted in a first portion, containing said axes thereof, for mounting said head with said first, second and third axes of said head parallel, respectively, with said first, second and third axes of said member;
said member is adapted in a second and different portion thereof for being mounted on said support means with said first, second and third axes of said member respectively parallel, lateral and normal to said track;
said member being substantially rigid in said first and third dimensions thereof; and
said member being adapted for flexible displacement of said first portion thereof with respect to said second portion in a direction parallel to said second axis thereof so as to cause lateral offset of said first axis thereof from said centered relation with said track, with each portion of said positioning member being laterally displaced to a degree that is a function of the first exponential power of the position of said portion along that dimension of said member that is generally most normal to the record medium surface.

24. A head positioning member as described in claim 23, wherein:
said member is a thin leaf element having width, thickness and length dimensions parallel, respectively, with said first, second and third axes thereof;
said second portion of said member being adapted for hinged mounting of said member for pivoting motion substantially in directions parallel to said second axis thereof, and
said member is made of magnetically permeable material so as to be magnetically positionable in said pivoting motion thereof.

25. A head positioning member as described in claim 23, wherein:
said member is a thin leaf element in the form of a piezoelectric bender element bendable in the directions of said second axis thereof, and having width, thickness and length dimensions parallel, respectively, with said first, second, and third axes thereof;
said second portion of said member being adapted for solid mounting on said support means.

26. A head positioning member as described in claim 25, wherein said member is formed of two piezoelectric ceramic plates bonded to an intervening substrate and sandwiched between two electrodes.

27. A head positioning member as described in claim 26, wherein said piezoelectric plates have axes of polarization extending in the directions of said second axis thereof.

28. A head positioning member as described in claim 27, wherein said positioning member has a length-to-width aspect ratio on the order of 2, and the thickness is on the order of 4% of the width.

29. A head positioning member as described in claim 25, wherein said member is formed with a hole through said second portion thereof, axially parallel to said second axis, for mounting of said member as by means of a bolt.

* * * * *